May 19, 1964        F. J. MURPHREE ETAL        3,134,104
PASSIVELY DETERMINING THE DISTANCE TO
THE SOURCE OF AN EXTERNAL FIELD
Filed Oct. 30, 1961        3 Sheets-Sheet 1

*INVENTORS*
Francis J. Murphree
Henry L. Warner
BY

*ATTORNEYS*

INVENTORS
Francis J. Murphree
Henry L. Warner

INVENTORS
Francis J. Murphree
Henry L. Warner
BY

ATTORNEYS

# United States Patent Office 3,134,104
Patented May 19, 1964

3,134,104
PASSIVELY DETERMINING THE DISTANCE TO THE SOURCE OF AN EXTERNAL FIELD
Francis J. Murphree and Henry L. Warner, both of Panama City, Fla., assignors to the United States of America as represented by the Secretary of the Navy
Filed Oct. 30, 1961, Ser. No. 148,773
3 Claims. (Cl. 343—112)
(Granted under Title 35, U.S. Code (1952), sec. 266)

The invention described herein may be manufactured and used by or for the Government of the United States of America for governmental purposes without the payment of any royalties thereon or therefor.

The present invention relates to the measurement of distance and, more particularly, to determining the distance to a source of an external field.

An object of the invention is to provide a method and apparatus for determining, from a relatively remote detecting point or points, the distance to an object generating an external field from measurements made on said field.

Another object of the invention is to provide a method and apparatus for determining, from a moving platform, the distance to a field-generating source lying on the line of movement of the platform.

Other objects and advantages of the invention will be apparent from the following detailed description, taken in conjunction with the accompanying drawings in which.

Figure 1:
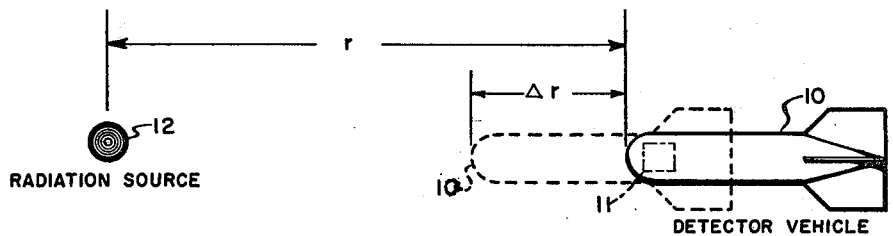
FIG. 1 illustrates schematically a radiation detector vehicle moving toward a radiation source.

The present invention is based upon the theory, which has been confirmed by experiment, that it is possible to measure passively the distance (range) to an object generating a magnetic, acoustic, electromagnetic, or other field whose effect at a distance can be described by the relation:

$$I_r = \frac{kI_o f(\theta)}{r^n}$$

where $I_r$ is the intensity of the field at a distance $r$ from the origin, $I_o$ is the magnitude at a unit distance from the origin, $k$ is a constant, $n$ is an exponent representing the spreading characteristic of the particular field, and $f(\theta)$ expresses the manner in which the value of the field varies as a function of the angle between some reference axis of the source and the direction in which the measurement is being made. While the term field intensity is applied to $I_r$ and $I_o$ it should be understood that the methods to be described are applicable where a measurable quantity characteristic of a given source can be expressed in the general form of the above equation. The exponent $n$ will, of course, vary depending upon what effect is measured and the detector characteristics as well as the type of field. Thus, for an electromagnet or acoustic field $n=2$ if the detector responds linearly to changes in power per unit area and $n=1$ if the detector responds linearly to changes in amplitude. For such fields, the range to the source can be determined from two measurements of the relative field intensity made at points a known distance apart lying on a line passing through the field source. This may be demonstrated analytically as follows:

Given that $$I_r = \frac{kI_o f(\theta)}{r^n} \quad (1)$$

Taking the derivative of $I_r$ with respect to $r$, keeping $\theta$ constant $$\frac{dI_r}{dr} = kI_o f(\theta)(-n)r^{-n-1} = -\frac{kI_o n f(\theta)}{r^{n+1}} \quad (2)$$

Dividing (1) by (2)

$$\frac{I_r}{\frac{dI_r}{dr}} = \frac{\frac{kI_o f(\theta)}{r^n}}{-\frac{kI_o f(\theta)n}{r^{n+1}}} = -\frac{r}{n}$$

and solving for the magnitude of $r$ $$r = \frac{nI_r}{\frac{dI_r}{d_r}} \quad (3)$$

$$r \cong \frac{nI_r}{\frac{\Delta I_r}{\Delta r}} \quad (4)$$

where $\Delta r$ is a small change in the range $r$ on a radius through the source; and $\Delta I_r$ is the corresponding change in $I_r$. It is noted that, in Equations 3 and 4, the spreading characteristic $n$ is in the nature of a coefficient.

Other relations can also be derived from which range can be explicitly or implicitly determined from measurements made at distances $r$ and $r_1$ with $r = r_1 \pm \Delta r$. For example, $$I_r = \frac{kI_o f(\theta)}{r^n} \quad (5)$$

$$I_{r_1} = \frac{kI_o f(\theta)}{r_1^n} \quad (6)$$

Subtracting Equation 5 from Equation 6 and dividing the result into Equation 5, $$\frac{I_r}{I_{r_1} - I_r} = \frac{\frac{kI_o f(\theta)}{r^n}}{\frac{kI_o f(\theta)}{r_1^n} - \frac{kI_o f(\theta)}{r^n}}$$

Simplifying, $$\frac{I_r}{I_{r_1} - I_r} = \frac{r_1^n}{r^n - r_1^n} \quad (7)$$

Equation 7 may also be expressed as $$\frac{I_r}{I_{r_1} - I_r} = \frac{1}{\left(\frac{r}{r_1}\right)^n - 1}$$

For $r = r_1 - s$, where $s$ is a constant, $$\frac{I_r}{I_{r_1}-I_r}=\frac{1}{\left(\frac{r_1-s}{r_1}\right)^n-1}=\frac{1}{\left(1-\frac{s}{r_1}\right)^n-1} \quad (8)$$

Figure 5:
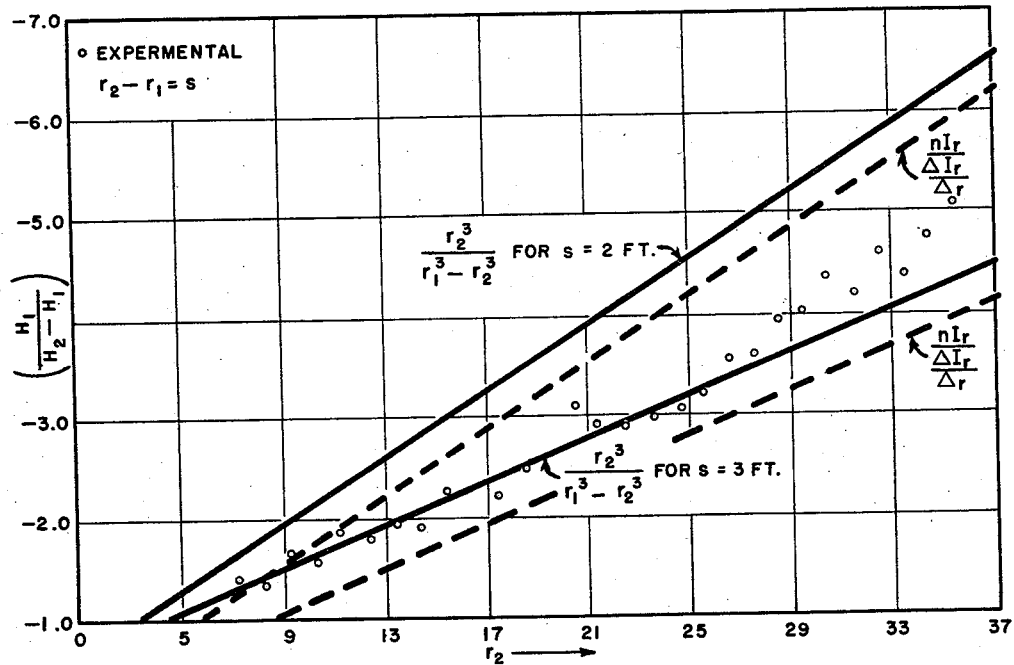
FIG. 5 is a graph of experimental results from the setup of FIG. 4 and of calculated results.

From Equation 8 it is seen that the value of $$\frac{I_r}{I_{r_1}-I_r}$$

depends solely upon the value of $r_1$ for a constant $s$ and $n$.

$$\frac{I_r}{I_{r_1}-I_r}$$

may hence be plotted for given values of $s$ versus $r_1$. FIG. 5 shows such a plot for the field of a magnetic dipole for $s=2$ feet and $s=3$ feet. The circled points for the 3-foot curve are observed experimental values obtained from two magnetometers with a line through their axis lying east and west in the horizontal plane to eliminate the effect of the earth's magnetic field. A bar magnet was used to establish the measured field. It is seen that the experimental points lie close to the calculated curve for values of $r_1$ less than approximately 30 feet.

The dashed lines below the $d=2$ and $d=3$ curves are plots of the approximate range relation $$\simeq \frac{nI_r}{\frac{\Delta I_r}{\Delta r}}=\frac{\Delta r n I_r}{I_{r_1}-I_r}$$

with $$\frac{I_r}{I_{r_1}-I_r}=\frac{H_1}{H_2-H_1}$$

and $\Delta r=2$ feet and 3 feet respectively. It is seen that the curves are parallel, with the approximate relation indicating a greater range in each case roughly equal to $d=\Delta r$.

By some further manipulation, Equation 8 can be reduced to the form:

$$r=\frac{d}{\left(\frac{I_r}{I_{r1}}\right)^{1/n}-1} \quad (9)$$

Equations 4, 7, or 9 can be mechanized to solve for $r$ although, in general, Equation 4 will be the simplest to use since its use does not involve finding powers or roots. In addition, Equation 4 can be easily manipulated to solve for any other term of the equation if the others are known.

Equations 4, 7, or 9 apparently apply to any field that can be described in Equation 1, such as gravitational, electromagnetic, magnetic, electrostatic, and acoustic, subject to certain limitations and precautions. In general, since their use will require the accurate measurement of a small difference in field intensity, circuit and/or external noise will ultimately limit the achievable range; the greater the separation $\Delta r$ of the detectors, the smaller the effect of noise will be. In addition, the field measured must be essentially the free space field of the object in question; techniques employed will have to minimize the effects of the detector on the field being measured, of reflecting objects in the vicinity and of any other fields of the same nature as that being measured. In the case of measurement of the distance to an object having the essential characteristic of a magnetic dipole, for example, if such measurements are made in the presence of the earth's magnetic field, the latter will have to be neutralized at the detectors. However, when applicable, use of these relationships will make possible passive range measurements that might otherwise be impractical. They would seem to be particularly applicable to measurements in space when attenuation, scattering, and reflection from near objects will frequently be relatively insignificant.

Devices utilizing the principles discussed will be of two different kinds:

(a) Those in which two detectors, separated a distance $\Delta r$, are mounted upon a suitable platform and arranged so that a line through their centers can be made to pass through the target. Field measurements will be made at the same time.

(b) Those in which a single detector is mounted on a platform moving at a known velocity toward a target; for the case of fields of uniform distribution ($f(\theta)$ is constant), the platform does not have to be moving on a line connecting the detector and the center of the target, but the range rate of the vehicle to the target must be known. Field measurements would be made at known intervals in this case.

As shown in FIG. 1, a vehicle 10 carrying a range measuring detecting unit 11 is moving towards a relatively remote source of radiation 12. As indicated, the distance to the source 12 is $r$ and, as will be discussed in connection with FIG. 2, two successive readings are taken by the detector unit 11 at the distance $r$ and at the distance $r-\Delta r$ when the vehicle 10 is in the position indicated by broken lines.

Figure 2:
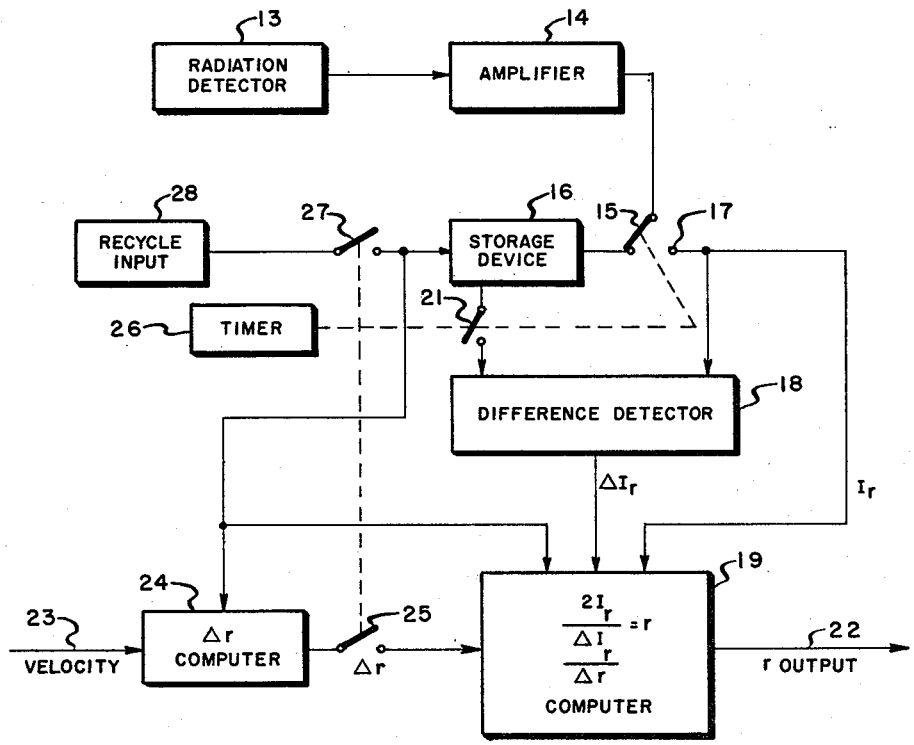
FIG. 2 is a block diagram showing an arrangement for determining range from the radiation received by the detector unit in the vehicle of FIG. 1.

In FIG. 2 is shown a simple block diagram of a suitable arrangement for the range-determining detector unit 11 as comprising a radiation detector 13 which is sensitive to the radiation emitted by the source 12 and here assumed to be electromagnetic, such as radio waves, heat waves, light waves, etc. The intensity of the radiation sensed by the detector 13 is converted into a corresponding electric signal which is passed through an amplifier 14 and a switch 15 to a storage device 16. Thereafter, the switch 15 is moved to open position and after a time interval, during which the vehicle 10 moves through the distance $\Delta r$, the switch 15 is moved into contact with a terminal 17 to connect the output of the amplifier 14 to a different detector 18 and to a computer 19. At the time the switch 15 is moved to the terminal 17, another switch 21 is moved to connect the storage device 16 to the difference detector 18. The difference detector 18 compares its two inputs from the storage device 16 and from the amplifier 14, respectively, to provide a quantity representing $\Delta I_r$ which is fed to the computer 19. The computer 19 is adapted to solve Equation 4 and provide, on its output lead 22, the value of $r$. The computer 19 may consist of two divider circuits connected in cascade, the quotient output of the first divider becoming the denominator (numerator) input of the second divider, and an operational amplifier for multiplying by a constant the output of the second divider. A divider suitable for this use is shown in FIGS. 2–13, page 53, Analog Computation, Albert S. Jackson, McGraw-Hill, 1960. If the value of $\Delta r$ is variable, such as would be the case with a constant time interval between successive readings and with the vehicle 10 moving at a velocity that is not constant, vehicle velocity information is fed over a lead 23 into a computer 24 which integrates the velocity information during the time interval the vehicle 10 moves through the distance $\Delta r$ to provide an output quantity $\Delta r$ which is consistent with the values $I_r$ and $\Delta I_r$. The computer 24 may be an operational amplifier used as an integrator. The value of $\Delta r$ is fed to the computer 19 by closing a switch 25 simultaneously with the closing of the switch 21 and the movement of the switch 15 to the terminal 17. When the computation by the computer 19 is complete, a timer 26, which has moved the switches 15, 21, and 25 as above described, returns these switches to their positions shown in FIG. 2 and closes a switch 27 to connect a recycle input 28 to the storage device 16 and to the computers 19 and 24 to prepare them for the next measuring cycle as determined by the timer 26.

It will be noted that in Equation 4, as reproduced on the computer 19, the value of $n$ has been made equal to 2 as the proper exponent when measuring electromagnetic radiation. Of course, the value of $n$ will be set to be appropriate to the type of field under study. Thus, nominally, for acoustic energy $n=1$; for a magnetic field $n=3$; and for a gravity field $n=2$.

Figure 3:
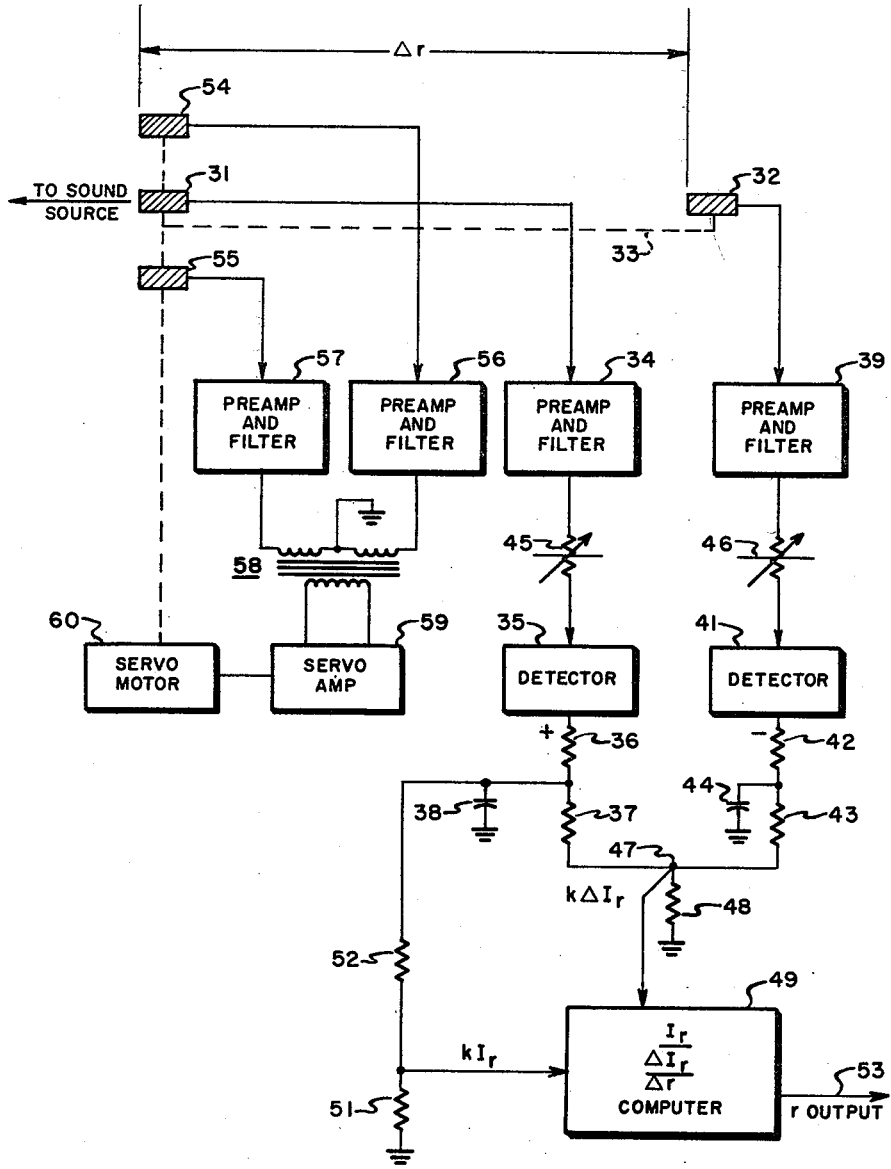
FIG. 3 is a block diagram showing an arrangement of apparatus for measuring the range to a source of underwater sound.

Instead of making two readings separated in time to obtain two readings separated in distance, as in the arrangement shown in FIG. 2, simultaneous readings may be taken by providing two field-sensing devices spaced the desired distance $\Delta r$. One suitable arrangement for accomplishing this result will now be discussed in connection with FIG. 3 which shows an arrangement for measuring the range to a source of underwater sound. In this FIG. 3, two hydrophones 31 and 32 are mounted in spaced relation on a rigid support 33, such spacing corresponding to the distance $\Delta r$. The output from the hydrophone 31 is amplified by a pre-amplifier filter 34 and amplitude detected by a detector 35, the output of which is smoothed by a RC filter composed of resistances 36 and 37 and a capacitor 38. The output of the hydrophone 32 is similarly processed through a pre-amplifier filter 39, an amplitude detector 41, and a smoothing R-C filter composed of resistances 42 and 43 and a capacitor 44. Variable gain devices 45 and 46 are included in the respective circuits of the hydrophones 31 and 32 for the necessary balancing of circuit gain. The resistances 37 and 43 are connected to a common terminal 47 which is grounded through a resistance 48. The values for the several resistances are chosen so that the following relation prevails: $36+37=42+43>>48$, thus the voltage across the resistance 48 is proportional to the difference in the outputs of the hydrophones 31 and 32, the polarity of the two detectors 35 and 41 being opposite as indicated in FIG. 3. A voltage proportional to $kI_r$ is fed into a computer 49 from a voltage divider consisting of resistances 51 and 52 connected between the filter output of the detector 35 and ground. A voltage proportional to $k\Delta I_r$ is also fed to the computer 49 from the terminal 47 common to the resistances 37 and 43. The computer 49 solves Equation 4 to provide on its output lead 53 the value of $r$ representing the distance to the sound source under study. The computed value of $r$ is an absolute value since, in the strict sense, it equals $-r$. Inasmuch as the hydrophones 31 and 32 are now a fixed distance apart, the value $\Delta r$ is constant and this value is supplied by the computer 49 so that only one divider stage is required instead of the two stages used in the computer 19. In the case of sound pressure being measured, $n=1$ in Equation 4.

The hydrophones 31 and 32 are alined perpendicular to the acoustic wave front, assuming a point source, so that the difference in sound pressure at the hydrophones 31 and 32 will correspond to their difference in range to the source. This alinement of the hydrophones 31 and 32 may be accomplished in any suitable manner, such as mounting them in assembly with two additional hydrophones 54 and 55 and spaced along a line normal to the line connecting the hydrophones 31 and 32. The hydrophones 54 and 55 are rotated to aline them parallel to the incoming wave front in any well-known manner. One suitable arrangement for doing so is disclosed in Patent No. 2,166,991 Guanella. The desired orientation of the hydrophones 54 and 55 may also be accomplished by the arrangement shown in FIG. 3 where the outputs of the hydrophones 54 and 55, after being amplified by amplifiers 56 and 57 respectively, are fed to opposite terminals of the series opposing primary winding of a transformer 58, the output of which functions through a servoamplifier 59 and a servomotor 60 to rotate the hydrophones 54 and 55 to bring their outputs equal in amplitude and phase. In some cases, the platform carrying the hydrophones 31 and 32 will be of such nature that its proper functioning in use will provide the desired orientation for these hydrophones 31 and 32. One example of a suitable platform is a deep-running homing torpedo which has acquired, as a target, a submerged submarine. By utilizing hydrophones having directive characteristics and suitable acoustic shielding, the received sound travels essentially a direct path, i.e., multipath sound is rejected.

Figure 4:
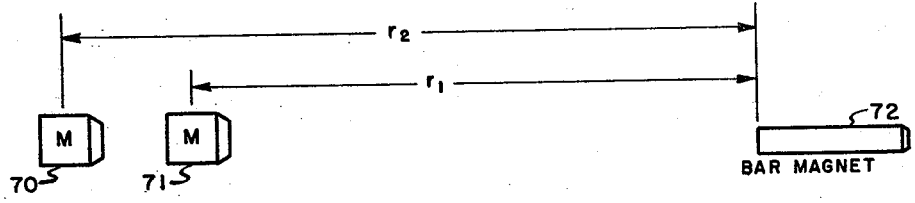
FIG. 4 illustrates an experimental setup for determining range from a magnetic field.

FIG. 4 illustrates an experimental setup utilizing two magnetometers 70 and 71 spaced, respectively, the distances $r_2$ and $r_1$ from a bar magnet 72. With $r_2-r_1$ held constant at 3 feet, the values plotted as circles in FIG. 5 were obtained for various values of $r_1$. As was mentioned above, the magnetometers 70 and 71 and the bar magnet 72 were alined in an east-west direction to eliminate any effect of the earth's magnetic field. The orientation of the magnet is immaterial as long as the line through the magnetometers extends through the center of the dipole, i.e., on a radial to the center of the dipole.

In FIG. 5 each of the broken lines plotted is an approximation but, since the error is constant, the computer can handle to give the correct values as shown by the solid lines.

While, for the purpose of disclosing the invention, preferred embodiments have been described in detail, it is to be understood that the invention is not limited thereto but is of the scope of the appended claims.

What is claimed is:

1. The method of determining, from a relatively remote detecting point, the distance to the source of an external field of known characteristics, comprising the steps of
    detecting the value of the external field as such detecting point,
    detecting the value of the external field at a detecting point adjacent to said such detecting point and spaced therefrom a known distance $s$ on the line defined by said source and said such detecting point,
    deriving from said detections separate electric signals having magnitudes respectively representative of the values of said field at said detecting points,
    subtracting one of said signals from the other signal to derive a difference signal, and
    dividing one of said signals by the quotient of said difference signal divided by $s$ to derive an index number, the value of said index number when multiplied by the spreading coefficient of the field indicating the distance to said source.

2. The method of determining the distance to a source of wave energy comprising:
    moving a wave energy detector towards said source,
    making at least two successive measurements of said wave energy at positions a substantial distance from one another,
    deriving from said measurements separate quantities having magnitudes respectively representative of one of said measurements and the difference between said measurements,
    determining the distance $s$ said detector moved between the making of said measurements, and
    dividing the quantity representative of said one of said measurements by the quotient of the quantity representative of the difference between said measurements divided by $s$ to derive an index number, the value of said index number when multiplied by the spreading coefficient of said wave energy indicating the distance to said source.

3. In a system for determining the distance to an object continuously radiating wave energy, the combination of:
    a receiver responsive to the wave energy from said object,
    means for varying the distance between the receiver and said object, means for storing the output of said receiver at a first distance of said receiver from said object,
means for determining the difference between said stored output and the output of said receiver at a second distance of said receiver from said object,
means for determining the difference distance between said first distance and said second distance, and
computer means for dividing a quantity representative of the output at said second distance by the quotient of a quantity representative of the difference between said outputs divided by a quantity representative of said difference distance and multiplying the quotient thereof by the spreading coefficient of said wave energy.

References Cited in the file of this patent

UNITED STATES PATENTS

| | | |
|---|---|---|
| 1,385,795 | Ries | July 26, 1921 |
| 1,961,757 | Gage | June 4, 1934 |
| 2,166,991 | Guanella | July 25, 1939 |
| 2,206,036 | Herson | July 2, 1940 |
| 3,020,397 | Pierce et al. | Feb. 6, 1962 |

OTHER REFERENCES

Underwater Acoustics Handbook, by V. M. Albers, The Penn. State University Press, 1960, p. 36 relied on.